US007592767B2

(12) United States Patent
Rodriguez et al.

(10) Patent No.: US 7,592,767 B2
(45) Date of Patent: Sep. 22, 2009

(54) SYSTEM AND RELATED METHODS FOR DIAGNOSING OPERATIONAL PERFORMANCE OF A MOTORIZED BARRIER OPERATOR

(75) Inventors: Yan Rodriguez, Suwanee, GA (US); Thomas B. Bennett, III, Wooster, OH (US); Paul J. VanDrunen, Navarre, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 293 days.

(21) Appl. No.: 11/717,867

(22) Filed: Mar. 14, 2007

(65) Prior Publication Data

US 2008/0224642 A1 Sep. 18, 2008

(51) Int. Cl.
*H02P 3/00* (2006.01)

(52) U.S. Cl. ........................ 318/466; 318/280; 318/286; 49/26; 49/28; 160/292

(58) Field of Classification Search ......... 318/466–472, 318/280–286; 49/26, 28; 160/292
See application file for complete search history.

(56) References Cited

U.S. PATENT DOCUMENTS

| | | | | |
|---|---|---|---|---|
| 5,929,580 | A * | 7/1999 | Mullet et al. | 318/466 |
| 6,097,166 | A | 8/2000 | Fitzgibbon et al. | 318/471 |
| 6,107,765 | A * | 8/2000 | Fitzgibbon et al. | 318/266 |
| 6,111,374 | A | 8/2000 | Fitzgibbon et al. | 318/282 |
| 6,161,438 | A | 12/2000 | Mullet et al. | 73/774 |
| 6,184,641 | B1 | 2/2001 | Crimmins et al. | 318/466 |
| 6,184,787 | B1 | 2/2001 | Morris | 340/521 |
| 6,310,451 | B1 | 10/2001 | Fitzgibbon et al. | 318/266 |
| 6,326,751 | B1 | 12/2001 | Mullet et al. | 318/434 |
| 6,340,872 | B1 | 1/2002 | Fitzgibbon et al. | 318/9 |
| 6,528,961 | B1 | 3/2003 | Fitzgibbon et al. | 318/283 |
| 6,542,077 | B2 | 4/2003 | Joao | 340/539 |
| 6,566,828 | B2 | 5/2003 | Fitzgibbon et al. | 318/283 |
| 6,587,046 | B2 | 7/2003 | Joao | 340/539.14 |
| 6,624,605 | B1 | 9/2003 | Powder et al. | 318/445 |
| 6,657,409 | B1 * | 12/2003 | Leivenzon et al. | 318/476 |
| 6,806,665 | B2 | 10/2004 | Fitzgibbon et al. | 318/282 |
| 6,888,335 | B2 * | 5/2005 | Sato et al. | 318/652 |
| 6,894,613 | B2 | 5/2005 | Stab | 340/545.1 |
| 7,017,302 | B2 | 3/2006 | Brookbank et al. | 49/200 |

(Continued)

FOREIGN PATENT DOCUMENTS

| | | |
|---|---|---|
| EP | 1 298 275 | 4/2003 |

*Primary Examiner*—Rita Leykin
(74) *Attorney, Agent, or Firm*—Renner Kenner Greive Bobak Taylor & Weber

(57) ABSTRACT

A barrier operating system having a diagnostic performance feature includes a motorized barrier movable between limit positions and a counterbalance system coupled to the barrier. A disconnect mechanism may be interposed between the motor and the counterbalance system so that the barrier can be moved manually without assistance from the motor. A position detection device is coupled to either the barrier or the counterbalance system and generates a barrier position signal. One of the motor and the position detection device generates operational parameter values for the barrier moving in either direction. A controller receives the operational parameter values and the barrier position signal, and as the barrier is manually moved, the controller compares operational parameter values for each direction of movement at a given position and generates a diagnostic signal based upon the comparison.

17 Claims, 6 Drawing Sheets

U.S. PATENT DOCUMENTS

| | | | | |
|---|---|---|---|---|
| 7,061,197 | B1 * | 6/2006 | Mullet et al. | 318/466 |
| 7,073,291 | B2 * | 7/2006 | Kawanobe et al. | 49/26 |
| 7,127,848 | B2 * | 10/2006 | Okada et al. | 49/28 |
| 7,183,732 | B2 * | 2/2007 | Murray | 318/280 |
| 7,196,611 | B2 | 3/2007 | Robb et al. | 340/5.71 |
| 7,208,897 | B2 | 4/2007 | Hotto et al. | 318/466 |
| 2003/0213177 | A1 | 11/2003 | Fitzgibbon et al. | 49/31 |
| 2004/0251868 | A1 * | 12/2004 | Sato et al. | 318/652 |
| 2005/0022451 | A1 | 2/2005 | Fitzgibbon et al. | 49/31 |
| 2005/0102903 | A1 * | 5/2005 | Takahashi | 49/28 |

* cited by examiner

SYSTEM AND RELATED METHODS FOR DIAGNOSING OPERATIONAL PERFORMANCE OF A MOTORIZED BARRIER OPERATOR

TECHNICAL FIELD

Generally, the present invention relates to diagnosing the operational performance of a barrier operator system. More particularly, the present invention relates to a diagnostic system that can specifically determine a location in barrier travel that is not within designated operational parameters. Specifically, the present invention relates to a diagnostic system that can be associated with different operational parameters during travel of the barrier for the purpose of determining whether the barrier is properly installed, or to diagnose problems with normal barrier operation.

BACKGROUND ART

As is well known, motorized barrier operators automatically open and close a barrier, such as a garage door or the like, through a path that is defined by a physical upper limit and a physical lower limit. The physical lower limit is established by the floor upon which the garage door closes. The physical upper limit can be defined by the highest point the door will travel, which can be limited by the operator, a counterbalance system, or physical limits of a door track system that carries the door. The operator's upper and lower limits are employed to prevent door damage resulting from the operator's attempt to move a door past its physical limits. Under normal operating conditions, the operator's limits may be set to match the door's upper and lower physical limits. However, operator limits are normally set to a point less than the door's physical upper and lower limits.

Forces needed to move the barrier vary depending upon the door position or how much of the door is in the vertical position. Counterbalance springs are designed to keep the door balanced at all times if the panels or sections of the door are uniform in size and weight. The speed of the door panels as they traverse the transition from horizontal to vertical and from vertical to horizontal can cause variations in the force requirement to move the door. Further, the panels or sections can vary in size and weight by using different height panels together or adding windows or reinforcing members to the panels or sections. In prior-art devices, these variations cannot be compensated for.

Barriers, such as garage doors, are sometimes difficult to install. In many cases the ground or floor as well as the frames on the structure which contain the barrier are not square. During installation of the barrier, the track system should conform to the structure and if the attachments are not square then the track system will not be square. When this occurs, the door binds during operation. Even if this may only appear to be a slight bind, after the door is cycled for a period of time, the binding can become worse. Binding adversely impacts the operation of the door as well as the motorized operator that moves the door. Further the door itself will begin to deteriorate causing additional damage to the door and greater loads on the operator.

The prior art discloses barrier operators with control logic that will alert the user as to what the condition of the operator is in and take corrective steps to take to correct the issues. Some systems propose an operating status information apparatus that outputs a combination of a warning signal and message clearly indicating the operating status, preferably without the assistance of any further information. However, such a system is directed at the unexpected action of the operator and does not address the initial installation of the barrier and whether the setup was proper and differentiates this from normal wear and deterioration of a barrier.

Other prior art operating systems are directed toward things that may occur during normal operation of the barrier and generate service reminders that will alert the user in different ways to allow proper maintenance of the motorized operator. However, these systems do not indicate whether the initial set up and installation was within a proper operational range of the barrier and how to correct for normal barrier deterioration that occurs over time.

It is also known to control a barrier operator with input from sensors to a controller. In these systems, a pulse counter detects speed of the garage door during transfer between first and second positions, and a potentiometer determines a plurality of positional locations of the garage door during transfer between first and second positions. A control circuit calculates a motor torque value from the speed for each of the plurality of positional locations to compare with a plurality of door profile data points, wherein the control circuit takes corrective action if the difference between the motor torque value for each of the plurality of positional locations and the plurality of door profile data points exceeds a predetermined threshold. The control circuit also updates door profile data points to the motor torque values for each respective positional location if the predetermined threshold is not exceeded.

In these prior art devices, if the barrier was not properly installed, the profiling of the operator would not allow an acceptable range of operation and the user had no knowledge of how to correct the installation short-comings of the barrier and in some cases the operator. If the door was binding, the controls would assume the door was heavier than it was and ultimately part of the predetermined operational range was included into the profiling routine leaving less of a range for operation abnormalities. Other prior art devices address a means to set and control the force settings but they provide no indication as to determining the proper set-up or installation of the barrier. And the art discusses the methods for teaching limits and motor speed as well as counting operational cycles as a means of monitoring barrier performance and setting up preventive maintenance.

It is also known to provide a controller that is connected to the motor drive unit and a wall console that resides inside the garage. The wall console also has a microcontroller. The controller of the motor drive unit is connected to the microcontroller of the wall console by means of a digital data bus. The microcontroller is able to learn when to stop the door and when to slow it down if there is a problem with the speed of the door, i.e., if there is binding of the door in the tracks, an obstruction present, a drop in the line voltage or if there is a mechanical problem such as a broken spring, wheel, etc. As in other prior art, this device addresses whether there is a change after the initial installation, but does not address whether the barrier was properly installed initially. Nor does this prior art device precisely identify where in the door travel a problem might be.

It is also known to provide a barrier with a transmission system providing connection between a motor and a door, and adapted to move the door between a closed position and an open position located above the closed position. This system provides an apparatus to generate a first signal representing a force used to move the door from the closed position to the open position, and to generate a second signal representing a force used to move the door from the open position to the closed position. A controller is responsive to the first signal and to the second signal to indicate an imbalance of the door when a difference between the first signal and the second signal exceeds a predetermined threshold. However, the ability to accurately pinpoint where the door imbalance occurs is not provided.

In the business of the installation of barriers, such as garage doors, the ability to keep trained installers has become more difficult. As these systems become more sophisticated due to improved electronic controls, the lack of trained installers causes a number of installation problems. Further in respect to consumers, if they install their own doors, the technology changes significantly between the time they put up their initial door and later replace it. Many times the issues that frustrate them and sometime cause them to return the product to the retailer, is the consumer's or installer's inability to achieve a proper installation.

The results of improper installation of a door system can result in the door dragging or binding which increases the wear on the drive components of both the door and the operator system. In products that are expected to have useful lives of many years, many only last for a couple of years and appear to the user to be operating properly. Moreover, as barrier systems, such as garage door systems have become more appearance oriented, these appearance modifications add weight to the door which effect the operation of the door and operator system. Without some guidance, consumers and installers may in fact make changes that cause the door to become inoperable.

What is needed is a controller for a motorized barrier operator that can determine whether the installation of the barrier and the operator were within an acceptable range, to give many years of service, and notify the user if this installation is not acceptable. Also if the installation is not within a proper range, resulting in possible severe reduction in service life, the controller will notify the user of exactly where the deficiencies are in door travel. Further, there is a need for the controller to continue to monitor the barrier and the operator throughout the product life and indicate to the user in a diagnostic procedure and identify any abnormalities that may occur due to the user's influence or normal deterioration and recommend the remedies to preserve the product's life.

DISCLOSURE OF INVENTION

In light of the foregoing, it is a first aspect of the present invention to provide a system and related methods for diagnosing operational performance of a motorized barrier operator.

Another object of the present invention is a barrier operating system having a diagnostic performance feature comprising a barrier movable between limit positions, a counterbalance system coupled to the barrier, a motor coupled to one of the counterbalance system and the barrier to assist in movement of the barrier, a position detection device coupled to one of the barriers, the counterbalance system and the motor, the position detection device generates a barrier position signal, and wherein one of the motor and the position detection device generates operational parameter values for the barrier moving in either direction, and a controller receiving the operational parameter values of the barrier position signal, the controller comparing operational parameter values for each direction of movement at a given position and generating a diagnostic signal based upon the comparison.

Yet another object of the present invention is a method for diagnosing operational performance of an installed barrier system comprising installing a barrier system which includes a motorized barrier operator system, moving a barrier of the barrier system with the motorized barrier operator system and storing operational parameter values, generating a position signal, comparing the operational parameter values at a position corresponding to the position signal and generating a diagnostic signal based upon the comparing.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
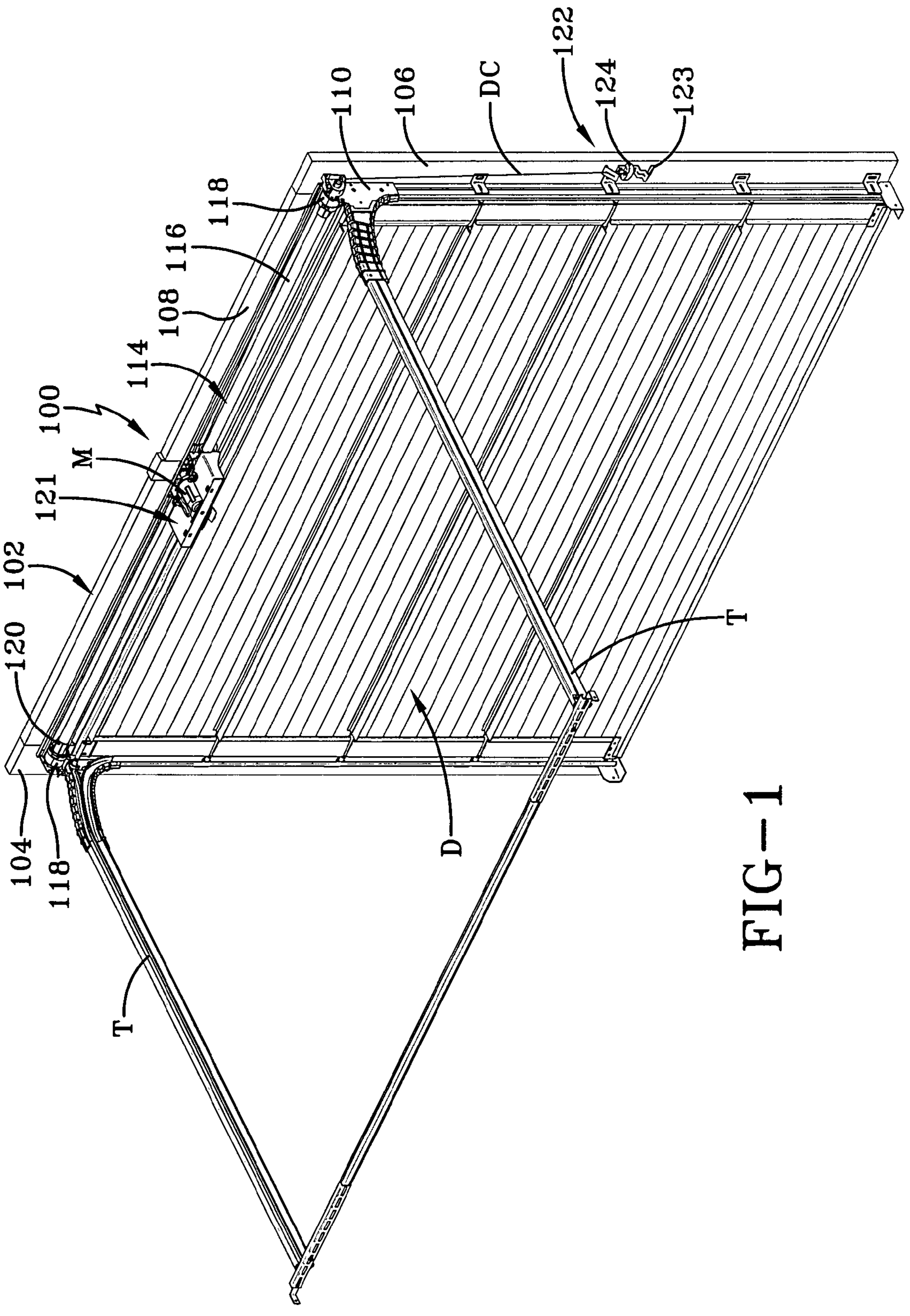
FIG. 1 is a rear perspective view of a sectional overhead garage door installation showing a motorized operator system according to the concepts of the present invention.

A motorized operator system that utilizes a diagnostic system according to the concepts of the present invention is generally indicated by the numeral 100 in FIG. 1. The operator system 100 shown in FIG. 1 is mounted in conjunction with a barrier such as a sectional door D of a type commonly employed in garages for residential housing. The opening in which the door D is positioned for opening and closing movements relative thereto is defined by a frame generally indicated by the numeral 102, which consists of a pair of spaced jambs 104, 106 which are generally parallel and extend vertically upwardly from the floor (not shown). The jambs 104, 106 are spaced apart and joined at their vertical upper extremity by a header 108 to thereby delineate a generally inverted u-shaped frame around the opening of the door D. The jambs and the header are normally constructed of lumber, as is well known to persons skilled in the art, for purposes of reinforcement and facilitating the attachment of elements supporting and controlling door D, including the operator system 100.

Affixed to the jambs 104,106 proximate the upper extremities thereof and the lateral extremities of the header 108 to either side of the door D are flag angles 110 which are secured to the underlying jambs 104,106 respectively. Connected to and extending from the flag angles 110 are respective tracks T which are located on either side of the door D. The tracks provide a guide system for rollers attached to the side of the door as is well known in the art. The tracks T define the travel of the door D in moving upwardly from the closed to open position and downwardly from the open to closed position. The operator system 100 may be electrically interconnected—via a wire or wireless connection—with a number of peripheral devices, such as a light kit, which may contain a power supply; a light, and/or a radio receiver with antenna. The receiver receives wireless signals—such as radio frequency or otherwise—for remote actuation of the peripheral device in a manner known in the art. The operator system 100 may be controlled by wired or wireless transmitter devices which provide user-functions associated therewith. The peripheral device may also be one or more network devices which generate or transfer wireless signals to lights, locks or other operational peripherals.

The operator system 100 mechanically interrelates with the door D through a counterbalance system generally indicated by the numeral 114. As shown, the counterbalance system 114 includes an elongated non-circular drive tube 116 extending between tensioning assemblies 118 positioned proximate each of the flag angles 110. While the exemplary counterbalance system 114 and associated drive depicted herein is advantageously in accordance with U.S. Pat. No. 7,061,197, which is incorporated herein by reference, it will be appreciated by persons skilled in the art that operator system 100 could be employed with a variety of torsion-spring counterbalance systems. In any event, the counterbalance system 114, which provides torsion springs maintained within the tube 116, includes cable drum mechanisms 120 positioned on the drive tube 116 proximate the ends thereof which rotate with the drive tube. The cable drum mechanisms 120 each have a cable received thereabout which is affixed to the door D preferably proximate the bottom, such that rotation of the cable drum mechanisms 120 operate to open or close the door D in conventional fashion M.

A disconnect mechanism 122 may be mounted to either one of the jambs 104,106. In particular, a disconnect cable DC has one end associated or coupled to the operator system and an opposite end terminated by a cable handle 123. A handle holder 124 is secured to either of the jambs 104,106 to hold the cable handle 123. The handle holder 124 provides at least two different positions for the cable handle so as to allow for actuation of the disconnect cable DC. As will be discussed in greater detail, the movement of the disconnect cable DC connects and disconnects the operator system to the counterbalance system as needed.

An operator control system 121 is mounted to the header 108 above the garage door D and is interconnected to the garage door's counterbalance system. As noted previously, the garage door is linked to the counterbalance system by one or more cables, typically two cables, with one cable on each side of the garage door. An operator motor M is maintained by the control system 121. The motor coacts, via a drive assembly (not shown), for the purpose of rotating the drive tube which, in turn, moves the door or barrier between limit positions. When the garage door is moved upward or downward, the cables are spooled onto (upward motion) or off of (downward motion) the counter-balance system cable drums. The rotation of the drums causes the counterbalance system to either wind or unwind the counterbalance spring. The motor rotates the counterbalance system in one direction to open the door and rotates the counterbalance system in the opposite direction to close the door. The counterbalance system is designed to wind (increase spring tension) or unwind (decrease spring tension) the tension within a spring, where the tension (force) within the spring corresponds to the weight of the door. If the counterbalance system contains more than one spring, the springs are independent of each other. During installation of the door and counterbalance system, an installer adjusts the springs' tension to the corresponding weight of the door.

For a properly balanced door, the door's weight and counterbalance spring tension are equal and remain equal during all positions of the door. When the door is properly balanced, it takes the minimum force possible to open or close the garage door. The force required to move the door is the force needed to begin the door's motion and to overcome all system friction within the counterbalance, the door's rollers, etc. To move a properly balanced door, the required force can be as small as a few pounds (with a light-weight door) to 25 pounds (for larger doors), but could be as high as 70 pounds for extremely heavy doors. If the door is unbalanced or if the door and the operator are improperly installed, then a higher than typical force is needed either to overcome the door's weight or a portion thereof to open the door (spring tension is too low), to overcome excessive spring tension to close the door (spring tension is too high), or to overcome excessive system frictions.

Figure 2:
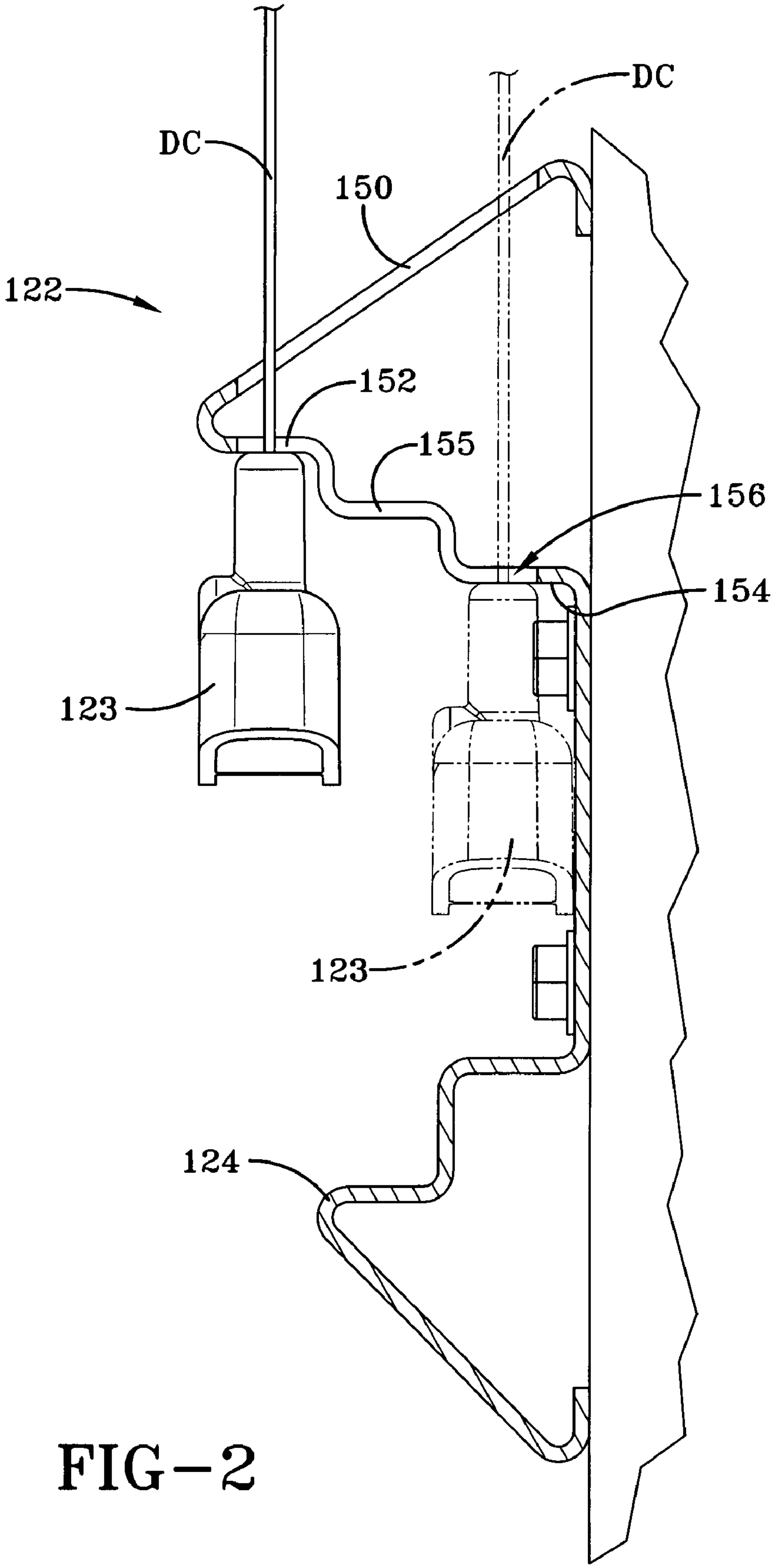
FIG. 2 is a side-elevational view showing a disconnect handle, which is part of a disconnect mechanism used between a motor and a counterbalance system, wherein the solid lines show the handle in an engaged position and the hidden lines show the handle in a disengaged position.

Referring now to FIG. 2, it can be seen that one end of the disconnect cable DC is attached to the cable handle 123. A handle holder, designated generally by the numeral 124, is secured to one of the jambs 104,106. The handle holder 124 has an exit slot opening 150 that allows for axial and lateral movement of the cable DC while also allowing the handle 123 to be retained by the handle holder 124. The holder 124 includes an engage step 152, and a disengage step 154 somewhat displaced from the engage step 152. An intermediate step 455 may be provided between the steps 152 and 154. An entry slot opening 156 is provided through the handle holder 124 between the steps 152 and 154, and the step 155 if provided. The openings 150 and 156 are aligned but not contiguous with one another so as to allow retained movement of the disconnect cable.

When the disconnect mechanism 122 is in an engaged position, the handle 123 is positioned adjacent the engage step 152. When it is desired to disconnect or disengage the drive mechanisms of the operator system, the handle 123 is pulled and, as shown in the hidden lines, is moved to the disengage step 154. This single step allows for a one-step disconnect mechanism. It will be appreciated that the intermediate steps can be employed to utilize a two-step disconnect mechanism. In other words, the handle and the handle holder could be configured to allow for incremental movement of the disconnect cable as deemed appropriate. By way of example, and in no way limiting, disengagement of the motor M may be as shown in the aforementioned '197 patent. As will be discussed, disconnection allows for manual movement of the door and implementation of a diagnostic routine. Of course, the diagnostic features described herein could be used with any barrier operator system that utilizes a motorized or not motorized counterbalance system.

Figure 3:
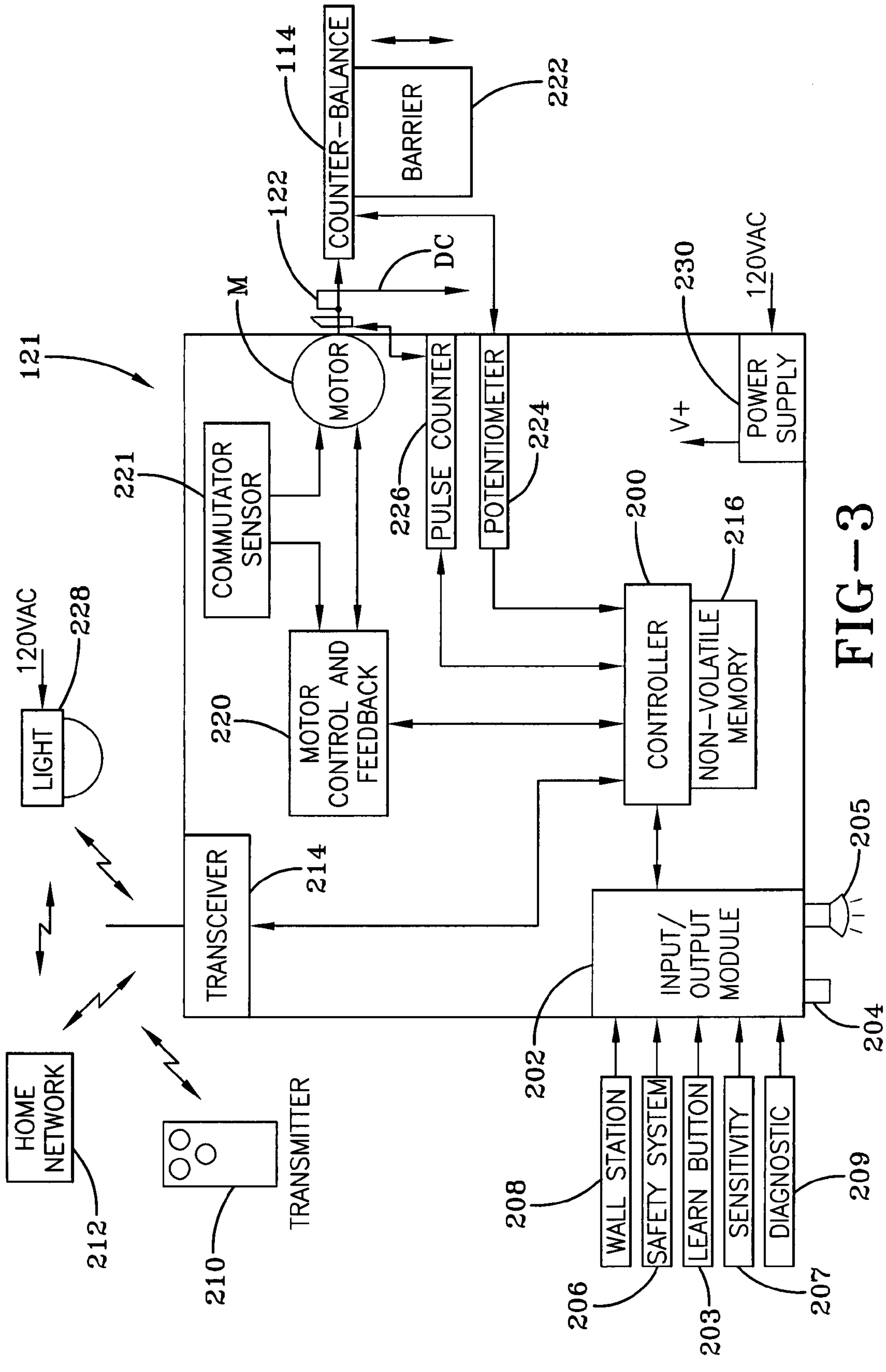
FIG. 3 is a schematic diagram of the motorized operator system according to the present invention.

Referring now to FIG. 3, it can be seen that the operator control system is designated generally by the numeral 121. The control system 121 is maintained on a control circuit board which carries the necessary circuitry and components for implementing the operator system and provides connectivity to other components maintained by the system 100. The operator system 121 includes a controller 200 which maintains the necessary hardware, software and memory for enabling the concepts of the present invention.

The controller 200 is connected to an input/output module 202 which receives user and sensor input for evaluation and generates command signals so as to implement the operating features of the systems 100. The module 202 provides a learn button 203 which places the controller in a learn mode for learning various transmitters and/or other components. The learn button could also be used to learn other functions. It will also be appreciated that other wireless features may be used to enable a program sequence for the purpose of the controller learning certain procedures. The module 202 may provide a program light 204, which may be in the form of a light emitting diode, to indicate programming status or other status of the controller or associated components. In the alternative, or in combination with the light 204, programming status or other status information of the controller or associated components may be provided by an annunciator 205. The annunciator 205 may generate a series of beeps, chirps or language-based verbal instructions.

Other inputs to the input/output module 202 may include signals generated by a safety system 206 such as a photo-electric eye or other devises used to detect entrapment of an object. A sensitivity adjustment 207 may also be connected to the module 202 for use in the diagnostic routines to be discussed. And user input, such as door move commands or other operator-related commands, may be provided through a wired, or wireless wall station transmitter 208. Additional functions that may be provided by the wall station transmitter may include but are not limited to delay-open, delay-close, setting of a pet height for the door, learning other transmitters to the operator and installation procedures used in learning a barrier to the operating system. A diagnostic button 209 may also be associated with the module 202. In certain embodiments, actuation of the button 209 will initiate a diagnostic routine. Predetermined button actuations from the wall station 208 or the transmitter 210, or input from the network 212 may also be used to initiate the diagnostic routine. For example, a constant application of pressure to a command button on a wall station, which is in a line of sight of the door, can be used to override any operator entrapment features and initiate the diagnostic procedure.

The controller 200 is linked or learned to various devices such as a remote/portable transmitter 210 and/or the wall station 208. The module 202 may be used to facilitate this learning process. Typically, the remote/portable transmitter 210 provides one of two functions wherein the primary function is for the opening and closing of the barrier and the secondary functions may control adjacent or less used barriers, or lighting fixtures and the like. The controller 200 may also be linked with a home network 212 wherein the home network communicates with the controller and other appliances or peripheral devices within a building or residence so as to incorporate the features of the controller into a home network for monitoring and other purposes.

The linkage between controller 200 and the transmitter 210, and the network 212 is achieved by a transceiver 214 which is a frequency appropriate device. The transceiver 214 allows for wireless communications between the controller and the various transmitters, transceivers and/or home networks and other accessories, such as a remote light assembly 228, as deemed appropriate by the end user. The controller 200 may be linked to an external memory device 216 but it will also be appreciated that the memory may be provided internally of the controller.

The motor M receives input from the controller 200 through a motor control and feedback circuit 220. It will further be appreciated that the motor control and feedback circuit 220 is configured so as to allow control of the motor's speed and force in operation of the system. The motor is connected to the door or barrier 222 via the counterbalance system 114. Accordingly, the motor is able to drive the barrier to an open position and assist in movement of the barrier to the closed position and takes action whenever an obstruction is detected. A current sensor, which is part of the circuit 220, is associated with the motor to monitor the amount of current drawn by the motor which can then be used by the controller 200 to determine operating parameters and which can further be used to monitor the motor for variations that may be indicative of an obstruction detection or other operating fault.

A commutator sensor 221, provides a commutator signal to the circuit 220, is associated with the motor so as to monitor spikes and the amount of voltage applied to the motor wherein these events can also be indicative of the operational performance of the motor and indicate detection of obstructions or other malfunctions in the operator system. The data generated by the commutator sensor 221 may be used in place of the data generated by the pulse counter to be discussed. The commutator of the motor generates a detectable spike as the motor shaft or armature rotates. This spike is a repeatable event that can be analyzed in much the same way as light pulses of the pulse counter. The spikes detected by the commutator sensor 221 may also be observed and used as an indication of barrier position. Indeed, the commutator sensor 221 may be used to generate a position signal.

A potentiometer 224 may be coupled to the door or the counterbalance system 114, or any component geared or meshed to the system 114 in such a way that a position of the door as it moves between limit positions can be ascertained. The potentiometer 224 generates a position signal that is received by the controller 200.

Other input received by the controller 200 may include a count signal from a pulse counter 226 which monitors the rotation of the drive assembly by virtue of pulses of light passing through a slotted wheel which can, in turn, be used to determine speed and position of the door with respect to the position limits. The pulse counter may also be in the form of Hall Effect sensors which detect passage of a magnet or magnets that may be associated with the door and/or the counterbalance system. As such, the pulse counter may also be used to generate a position signal.

A timer or clock may also be connected to or maintained by the controller 200 to monitor and associate the occurrence of various other variables, such as position signals, with respect to time considerations. This can be used to determine speed or to provide a base-line profile or threshold for other forces monitored by the controller.

An external light 228 may be provided so as to provide illumination or signal various operating features of the controller or programming stages as needed. The light 228 may be controlled by a wired or wireless signal received from the controller or via the home network. And as can be seen in FIG. 3, the disconnect mechanism 122 is effectively interposed between the motor M and the counterbalance system 114. A power supply 230 receives mains power supply, such as 120V AC, and provides regulated power to all the components maintained by the control system 121.

Figure 4:
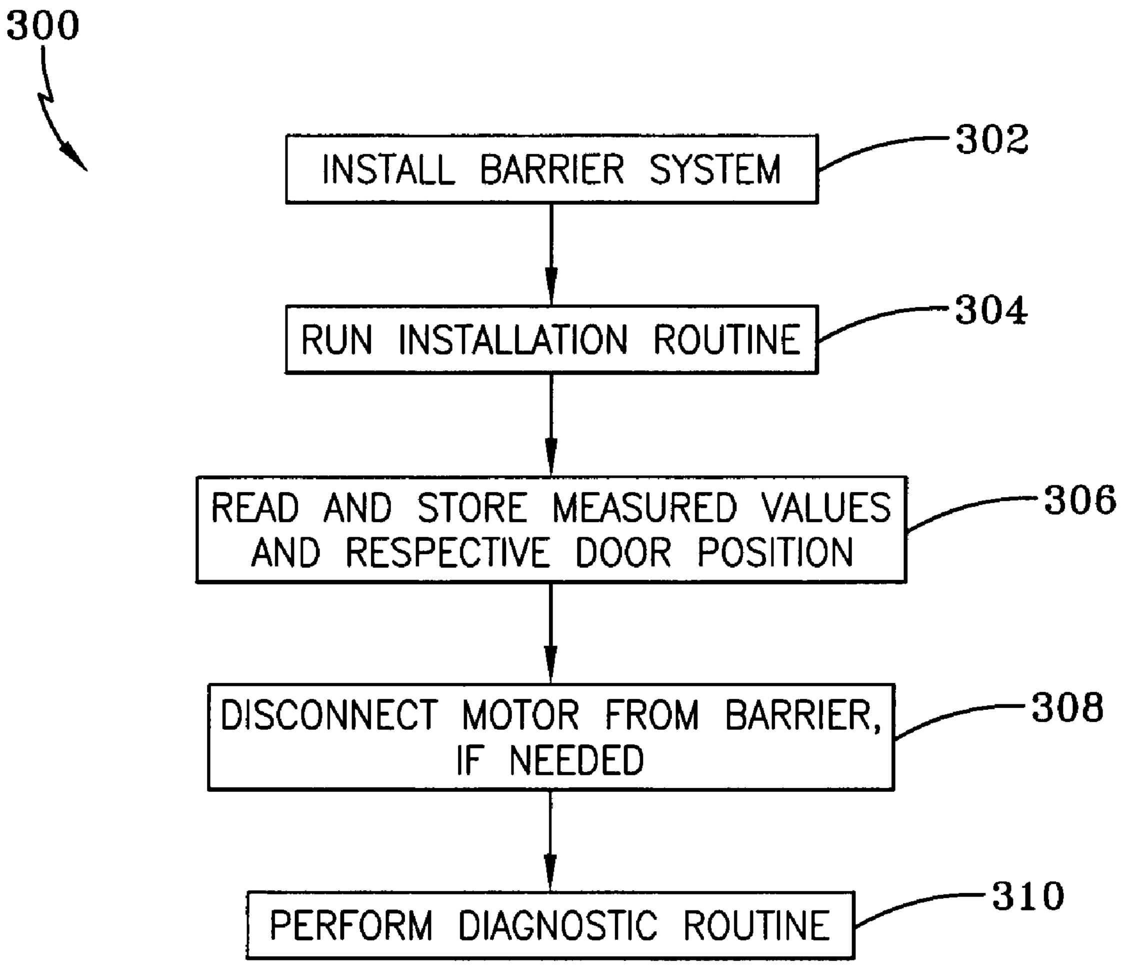
FIG. 4 is an operational flow chart setting forth the initial steps for installing a barrier system and performing a diagnostic routine.

Referring now to FIG. 4, an operational flow chart representing the operational steps for entering a diagnostic mode for the operating system 100 is designated generally by the numeral 300. At step 302, installation of the door on the tracks, connection of the operator system to the counterbalance system and the corresponding connection of the counterbalance system to the door is completed. At step 304, the installer actuates an install routine. This procedure may be implemented from the wireless wall station or by other mechanisms. Ideally, an install button on the wall station is a hidden or recessed button which can only be accessed with a special tool. In any event, the install button is held for a predetermined period of time such as 5 seconds so as to activate the install mode or if hidden or requiring a special tool the activation can be momentary contact. During this mode, as the door moves in either direction, the light 204 associated with the controller or the overhead light 228 blinks on/off at a predetermined rate such as one-half second.

The operator opens and closes the door and at the end of the close cycle the operator determines and stores within the controller a profile of the door travel characteristics and the door's open and closed limits at step 306. Alternatively, a door-move button on the wall station can be used if no profile is previously stored and the door-move command has been received. In this alternative mode, the opener moves to a fully open position and blinks the overhead light on/off during the move. At the start of the next door-move command to bring the door down toward the closed position, the opener again blinks the lights as the door is closing. In this installation procedure, the door-move button can be pressed and the door system is stopped awaiting the next command to come down.

As noted during step 306, the door profile may be established with any number of parameters or combination of parameters that are monitored operational components of the operator system 100. The door position limits and a door position between those limits can be established by utilizing the timer and the various sensors. In particular, the door direction and/or position and position limits can be determined from the potentiometer, the pulse counter, the commutator sensor and/or the motor current sensor. As technology develops, it is believed that position signals could also be generated by any number of sensors associated with the barrier and/or the counterbalance system.

Another parameter that may be derived from the feedback circuit 220 is door velocity and this is obtained by use of the timer; and the potentiometer, the pulse counter or the commutator sensor. The pulse counter produces a pulse train signal, the frequency of which is directly related to the speed of the door system. The pulse counter uses a number of evenly spaced slots, such as 64, which revolves as the counterbalance tube rotates. Each slot blocks a light beam as the slot rotates which produces a discreet signal (pulse-train) used by the controller 200. The controller counts each "tick" and resolves the relative door location down to about 0.1 inch. The speed of the door system may be stored in a profile table corresponding to the positional information. Once fully established, the profile window and a minimum speed can be determined from the pulse counted data. The commutator sensor can be used to measure each edge-to-edge transition which is time measured and averaged with the last predetermined number of measurements such as eight. The minimum measurement is recorded in the profile table and may be used as a diagnostic tool as will be discussed, or as a comparison against the next door-move across this interval. Alternatively, another data variable or characteristic that may be maintained by the door profile is motor current which is established by the current sensor maintained within the circuit 220.

In summary, for a sectional garage door with a counterbalance system controlled by a garage door operator, the operator accumulates and then stores in non-volatile memory associated with the controller 200, operational parameter values related to the performance of the barrier's motion. Regardless of the parameter, characteristic or variable monitored and stored at step 306, the data is assembled and stored in arrays or fields associated with each direction of movement.

In one embodiment, the operator controller acquires two instantaneous current draw values for every AC line cycle (two readings every 16.7 milliseconds). The operator controller invalidates the highest value as noise and maintains the lowest value. The operator controller than calculates an average value from the previous sixteen maintained or other predetermined number of values. Average current draw values are then retained for about every pre-determined increment of door travel such as 0.4 inches, and the highest average value obtained over the pre-determined increment of door travel is stored in the non-volatile memory array. This process is repeated for every pre-determined increment of door travel, thereby storing over two hundred values in the array for eight feet of door travel. Of course, any number of values could be stored depending upon the predetermined increment value and the amount of resolution desired. This process is performed for the opening direction of door travel and for the closing direction of door travel, thereby producing two independent arrays in non-volatile memory.

As noted previously, door position may be determined by the potentiometer which is geared to the counterbalance system, and in the present embodiment about four-inch travel segments are utilized. As the potentiometer's handle or arm position changes in relation to the rotation of the counterbalance system, the potentiometer's value changes. Each potentiometer position has a unique value, where each unique potentiometer value corresponds to a unique door position. Accordingly, the potentiometer's value corresponds to the door's position. Accordingly, at any time, the operator controller can determine the exact door position by reading the potentiometer's value—within the tolerances of the potentiometer.

In addition to monitoring the motor's current draw, the operator controller may derive door velocity using the potentiometer. The potentiometer's value change over a time period is equivalent to the door's speed. Specifically, the potentiometer may have 1028 distinct values over 8 feet of door travel. The number of distinct values is dependent upon the sensitivity of the potentiometer selected. The 1028 values allow the total distance to be defined into 1027 divisions, wherein a division is a distinct potentiometer value. For every division, a counter maintained by the controller is incremented by one every two milliseconds. This count value measures the time the door remains in each division. As such, a new count is started upon each new division. After a division count value is acquired, which is the segment that corresponds to about the predetermined increment of door travel, the largest count value of the count values is stored in the non-volatile memory array. The largest count value corresponds to the slowest door speed over the incremental segment of door travel. Accordingly, every array element stored in the non-volatile memory contains an index value which corresponds to the door's position for this segment of door travel, the motor current draw value and the door speed value. It should be appreciated by those skilled in the art that the operator controller only stores the motor's current draw and the door speed for the closing direction, but only stores the motor's current draw for the opening direction. The monitored door speed during opening is concerned only with a motor stall—wherein the door stops moving. If the count value at any division exceeds a predetermined value, then the door is assumed to have been stopped by an obstacle and corrective action is taken, which for the opening direction is simply turning off the motor. In a similar manner, detection of current spikes by the commutator sensor can be used in place of the potentiometer values of the "tick" generated by the pulse counter.

Regardless of the parameters utilized, the array of data is known as the barrier's operational profile, with one array for the opening direction and another array for the closing direction. After each successful barrier operation from one position limit to the other position limit, the array for that direction is updated to the last measured and calculated values. Accordingly, the arrays stored in the non-volatile memory correspond to the last barrier motion for the respective barrier directions.

The profile arrays are utilized to determine if the barrier motion for it's current direction and position is within predetermined requirements. In other words, if the actively measured motor current draw increases to a value higher than allowed compared to the stored current draw value, the operator controller makes the assumption that the door has encountered an obstacle and the operator takes corrective action, such as stopping the barrier or reversing the barrier's direction. Alternatively, if the actively measured current speed decreases lower than allowed compared to the stored speed value, the operator makes the assumption that the door has encountered an obstacle and the operator takes corrective action, such as stopping the barrier or reversing the barrier's direction.

Continuing with the process 300, upon completion of step 306 in regard to collection of operational data, the installer or user, if needed, may disconnect the motor from the barrier at step 308. As previously noted, this is accomplished by pulling the cable handle 123 and disengaging the motor from the counterbalance system. Accordingly, any activation of the motor is ineffective in moving the barrier between position limits. And with the motor disconnected, the barrier can be moved manually by the user. Upon completion of step 308, the user may then implement the diagnostic routines at step 310, wherein the diagnostic routines are fully elaborated on in discussion related to FIGS. 5 and 6. It will be appreciated that disconnection and manual movement allows for a precise determination of barrier position and, as such, a precise location of defective door components and/or installation. However, the diagnostic routine could also be run without disconnecting the motor. If the motor is disconnected, the barrier position signal is provided by the potentiometer. If the motor is not disconnected, then the barrier position signal may be provided by either the commutator sensor or the pulse counter.

Figure 5:
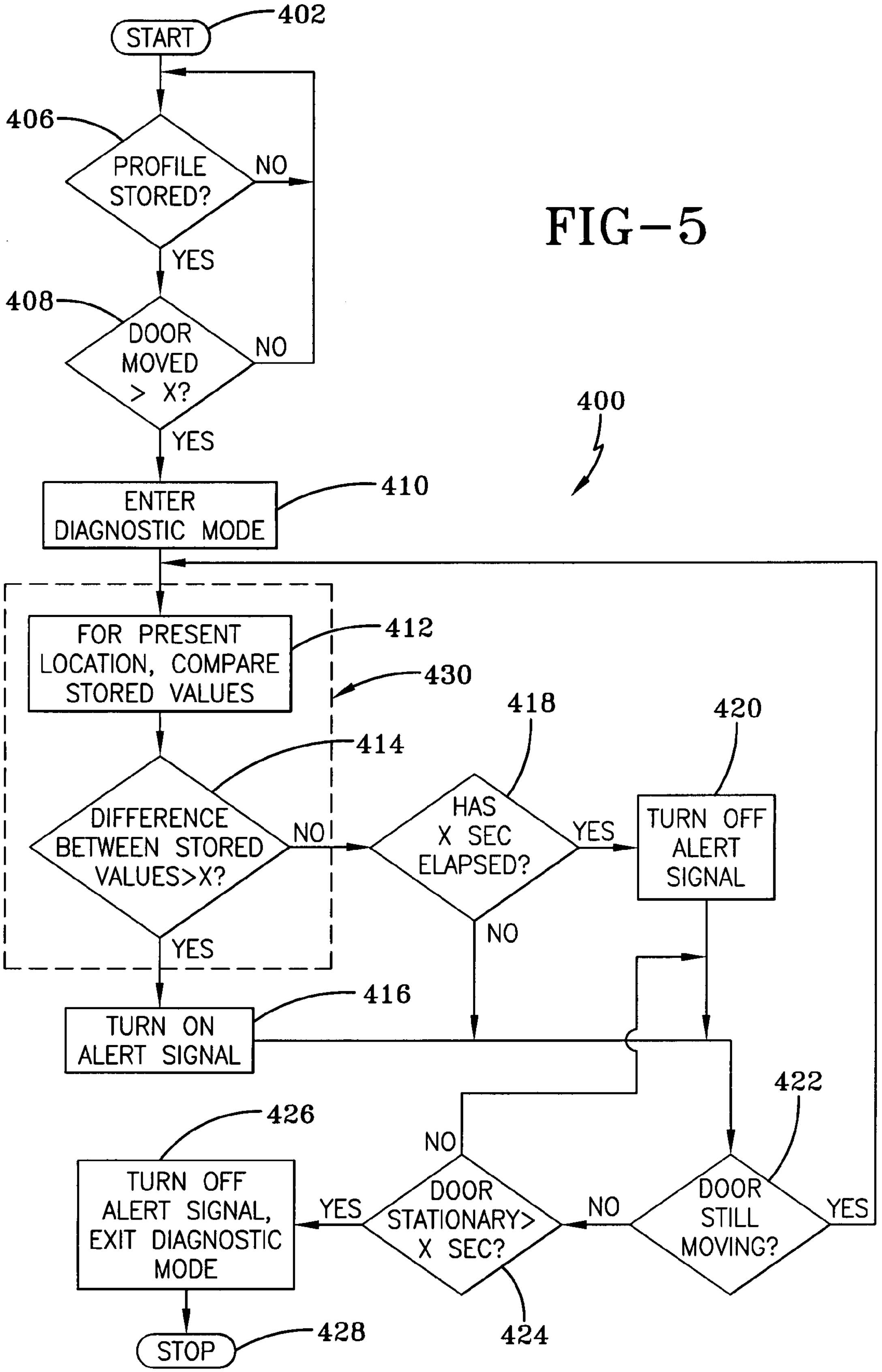
FIG. 5 is an operational flow chart setting forth the operational steps of a diagnostic evaluation of a motorized barrier operator.

Referring now to FIG. 5, it can be seen that a diagnostic procedure is designated generally by the numeral 400. Briefly, at step 402 the diagnostic procedure is started. Initially, at step 406, the controller determines whether the operator has accumulated and stored in non-volatile memory the operational parameter values related to the performance of the barrier's motion (profile). If the system has not recorded a profile, then the controller repeats step 406 until such time that it is determined that the operator has stored a profile. At step 408, once it is determined that a profile exists in non-volatile memory, the controller determines whether the barrier has been moved a predetermined distance such as 4 inches. If the door has not been moved the predetermined amount, then the procedure returns to step 406. However, if the door has been moved the predetermined amount, then the procedure continues to step 410 and enters a diagnostic mode. As noted previously, the diagnostic mode may be entered upon detection of manual movement of the door, or by direct user input such as actuation of the diagnostic button 209; or predetermined input from the transmitter, wall station, home network or other related device.

In regard to step 408, it will be appreciated that if the user first disengages the motor from the counterbalance system by pulling the disconnect handle so that it is in the "manual mode," the motor is disconnected from the counterbalance system, but maintains the potentiometer connection to the counterbalance system. Next, the user manually moves the door upward or downward. The controller, which is always reading the potentiometer value if connected, then detects any significant door movement, for example greater than 0.5 inch of movement. After the door has moved a minimum distance, as noted in step 408, the operator controller enters the diagnostic mode.

At step 412, the controller compares the values stored in the closing profile array and the opening profile array for the specific door location. In other words, as the user or the motor continues to move the door upward or downward during the diagnostic mode, the operator controller compares, for every segment of door position, the stored motor current draw value for the opening direction to the stored motor current draw value for the closing direction. As noted previously, other stored parameter values could be compared. Next, at step 414, if the difference between the stored values is greater than a predetermined value, for example 0.25 amps, the operator controller generates a feed back signal such as a pulsating alarm via the annunciator 205 or a visual indicator such as a flashing LED via the light 204 for a predetermined period of time, such as 5 seconds. This is embodied at step 416, wherein an alert signal is turned on. However, if the difference between the two stored values is equal to or less than the predetermined value, then the process moves to step 418 where the controller determines whether a predetermined period of time has elapsed or not. If the time period has elapsed, and the alert signal had been previously turned on, then at step 420 the alert signal is turned off. If the time period at step 418 has not elapsed, or upon completion of step 420, the process continues to step 422.

At step 422, the controller assesses whether the door is still moving or not. If the door is moving, the process returns to step 412. As such, whenever the user or motor moves the door to a new location, either upwardly or downwardly, new segment values are compared. However, if the door is not moving, then the process continues to step 424 to determine whether the door is stationary for a predetermined period of time. If it is not, then the process repeats step 422. However, if the door is stationary for the predetermined period of time, then the process continues to step 426 where the alert signal is turned off and the diagnostic mode is exited. Upon completion of step 426 the process 400 is stopped at step 428.

It will be appreciated that the alert signal generated at step 416 can be a singular signal that is active whenever the difference between the values is sufficient, or can be a plurality of unique signals, where each unique signal indicates the magnitude of difference between the compared signals. For example, the signal may be a single sound beep or light flash and a pause for a small difference, two beeps or light flashes and a pause for a moderate difference, and three beeps or light flashes and a pause for a large difference. Of course, any combination of beeps and flashes may be used.

Figure 6:
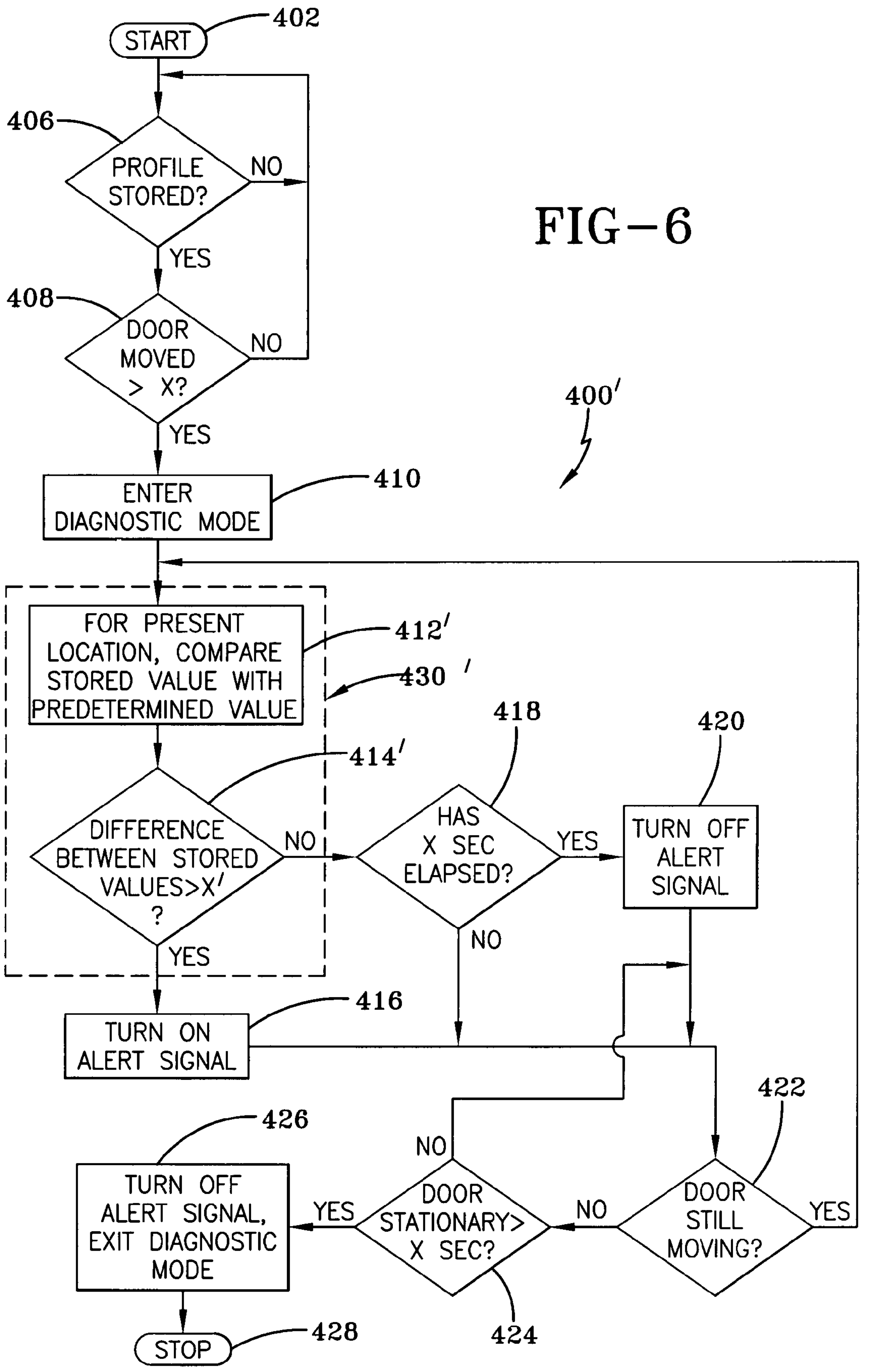
FIG. 6 is an alternative embodiment of an operational flow chart setting forth the operational steps of a diagnostic evaluation of a motorized barrier operator.

Referring now to FIG. 6, it will be appreciated that the data that is compared in the diagnostic mode can be compared to different values if needed. Accordingly, it will be appreciated that in FIG. 6 the process 400 is modified by the process designated generally by the numeral 400' wherein the steps 412 and 414, which are designated as subroutine 430 in FIG. 5, are substituted by a subroutine 430' that includes steps 412' and 414'. In the present embodiment, step 412' compares stored values with predetermined values for a location of a door as it is moving during the diagnostic mode. If the difference between the stored value and predetermined value is greater than X', then an alert signal is turned on as indicated by step 416. However, if the difference between the stored values and X' is not greater as designated, then the procedure continues on to step 418.

This methodology allows for determination as to whether the door system is properly installed by comparing the stored values and the arrays to a predetermined value, except that instead of comparing the open direction values to the closed direction values, the open or closed direction values are compared against a predetermined value. The predetermined value can be factory set, or by a user-sensitivity adjustment 207 within the operator which would require some type of manual or electronic input provided by the user to the operator controller, or by other means. It will be appreciated that these other means can include input from a wall station or other transmitter, or ideally from a home network input. It will also be appreciated that in this diagnostic mode the alert signals could be sent to the home network system for communication to other devices in the home network system for further evaluation or analysis. The predetermined value could also be used for both the open or closed value comparisons, or there could be two unique values, one for the comparison with the open direction and another for comparison for the close direction values. It will further be appreciated that the motor current draw values stored in the array for opening and closing door travel could be replaced with other parameters related to the barrier's motion such as barrier speed, motor shaft rotational speed, or acceleration/deceleration of the barrier's traveled speed. And it will further be appreciated that the segment size utilized for segment windows can be decreased for greater resolution and accuracy or increased for less resolution and accuracy.

The differences in the values in the arrays for the opening and closing direction may be indicative of out of balance or other conditions which hinder the proper movement or operation of the door. For example, one or more of the springs associated with the counterbalance system may be improperly adjusted. Other causes of the out of balance condition detected in the diagnostic modes could be that one of the springs in a multi-spring counterbalance system has broken, a door hinge may be broken or a door roller is damaged, or the door's track system is damaged, or another door-related component is broken, damaged, missing or performing improperly. As a result of these various conditions, the operator's motor may overheat due to the excessive force required to move the door between limit positions, or the operator controller may have become desensitized to obstacles within the door's path. In other words, entrapment may not have been detected by the change in the updated door profiles, but a variance between the forces required in the opening and closing directions may be indicative of other problems. Alert signals may also be generated as a result of undue wear and tear on the door, the counterbalance system and the operator, thereby reducing longevity of the system. It will further be appreciated that one of the counterbalance springs may have relaxed due to wear or a defective coil in the spring. Yet another reason for generation of an alert diagnostic signal is that the operator may be improperly mounted to the structure or the operator may be improperly connected to the counterbalance system. For example, the various gears may be misaligned or there may be various types of debris between the various gear interconnecting mechanisms. An error may also indicate that the structure, e.g. garage, or other structure components such as the framing lumber may have significantly changed position due to weather conditions or the like.

It will be readily appreciated that the disclosed system has a number of advantages. It allows for precise determination of wear in a door movement's path so that a fault can be detected. Indeed, the system determines barrier performance at multiple points throughout the barrier's travel. The system can determine barrier performance independently for the opening direction and closing direction of travel, and the system can store operational parameters of the motorized operator at multiple positions of the barrier's travel and updates these parameter values after each successful limit-to-limit operation of the system. These values can then be used by the diagnostic system to determine the barrier's performance. Still another advantage is this diagnostic procedure can take place with the operator motor de-energized and the barrier and the operator's performance can be tested and re-tested at any time by the user. Indeed, the barrier can be moved to specific locations to test the barrier's performance so that problems associated with the barrier system can be precisely identified. As a result of these advantages, the door system and/or the operator system can be operated to achieve their anticipated product life. In other words, by running the diagnostic system at recommended intervals, problems can be detected in the operation of the door that might not otherwise be detected during a normal operational sequence. Such a feature allows the user or installer to be assured that both the door and track systems are properly installed. This minimized installation and trouble-shooting time and assists the installers in identifying problem areas more quickly.

Moreover, if changes are made to the door or the operator system, such a diagnostic system can notify the user as to whether those changes will affect the product life. For example, if a new counterbalance spring is installed, the operator and barrier system can be diagnosed immediately to ensure that all features are operating together at a desired manner. Finally, such features provide instructive input to installers based on improper installations so as to teach installers and new installers the proper way to install the door and operator system.

Although the diagnostic system disclosed herein is intended for header-mounted garage door operators, it will be appreciated that the diagnostic procedures can be practiced with any barrier operator, such as a conventional rail and powerhead garage door operator, a gate operator, a window covering operator (an operator that opens and closes a barrier over a window), etc. Indeed, the diagnostic system is intended for upward-acting sectional garage doors, but can be practiced with any type of barrier, such a one-piece garage door, a horizontally-moving garage door, a gate, a window covering, etc. And it will be appreciated that the diagnostic system can be practiced with most types of barrier counter-balance systems or with barriers without a counterbalance system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A barrier operating system having a diagnostic performance feature, comprising:

a barrier movable between limit positions;

a counterbalance system coupled to said barrier;

a motor coupled to one of said counterbalance system and said barrier to assist in movement of said barrier;

a position detection device coupled to one of said barrier, said counterbalance system and said motor, wherein said position detection device generates a barrier position signal, and wherein one of said motor and said position detection device generates operational parameter values for said barrier moving in either direction;

a controller receiving and storing said operational parameter values and said barrier position signal; and a diagnostic input connected to said controller, wherein initiation of said diagnostic input changes the barrier operator system from an operational mode to a diagnostic mode during which said barrier is moved and said controller compares operational parameter values for each direction of movement at a given position of barrier movement, and generates a diagnostic signal based upon the comparison.

2. The system according to claim 1, wherein said controller in said diagnostic mode compares operational parameter values for barrier movement in a first direction to operational parameter values for barrier movement in a second direction.

3. The system according to claim 2, wherein said controller in said diagnostic mode generates an alert diagnostic signal if the difference of said comparison is greater than a predetermined amount.

4. The system according to claim 3, wherein said alert diagnostic signal is proportional to the difference determined by said comparison.

5. The system according to claim 1, wherein said controller in said diagnostic mode compares operational parameter values for barrier movement to predetermined values.

6. The system according to claim 5, wherein said controller generates an alert diagnostic signal if the difference of said comparison is greater than a predetermined amount.

7. The system according to claim 6, wherein said alert diagnostic signal is proportional to the difference determined by said comparison.

8. The system according to claim 1, wherein said diagnostic signal is selected from the group consisting of an audible signal, a visual signal, and a network signal.

9. The system according to claim 1, wherein said position detection device is one of a potentiometer, a pulse counter, and a commutator sensor.

10. The system according to claim 1, further comprising:

a disconnect mechanism interposed between said motor and said counterbalance system so that said barrier can be moved manually without assistance from said motor, and wherein said position detection device is a potentiometer such that if said motor is disengaged from said counterbalance system and said barrier is manually moved, said controller in said diagnostic mode generates said diagnostic signal based upon said barrier position signal generated by said potentiometer.

11. A method for diagnosing operational performance of an installed barrier system, comprising:

installing a barrier system which includes a motorized barrier operator system;

moving a barrier of said barrier system with said motorized barrier operator system;

generating a position signal and storing parameter values for defined segments of barrier movement according to said position signal;

initiating a diagnostic mode;

moving the barrier while in said diagnostic mode;

comparing said operational parameter values at defined segments corresponding to said position signal; and generating a diagnostic signal based upon said comparing.

12. The method according to claim 11, further comprising:

comparing said operational parameter values for barrier movement in a first direction to operational parameter values for barrier movement in a second direction while in said diagnostic mode.

13. The method according to claim 12, further comprising:

generating said diagnostic signal if the difference of said comparison is greater than a predetermined amount.

14. The method according to claim 11, further comprising:

comparing said operational parameter values for barrier movement to predetermined values while in said diagnostic mode.

15. The method according to claim 11, further comprising:

generating said position signal from a potentiometer coupled to said barrier operator system.

16. The method according to claim 11, further comprising:

generating said diagnostic signal in the form of one of an audible signal, a visual signal, and a network signal.

17. The method according to claim 11, further comprising:

disconnecting said barrier from said motorized barrier operator system;

generating said position signal from a potentiometer as said barrier is manually moved; and generating said diagnostic signal based upon said position signal generated by said potentiometer.

* * * * *